Figure 1:
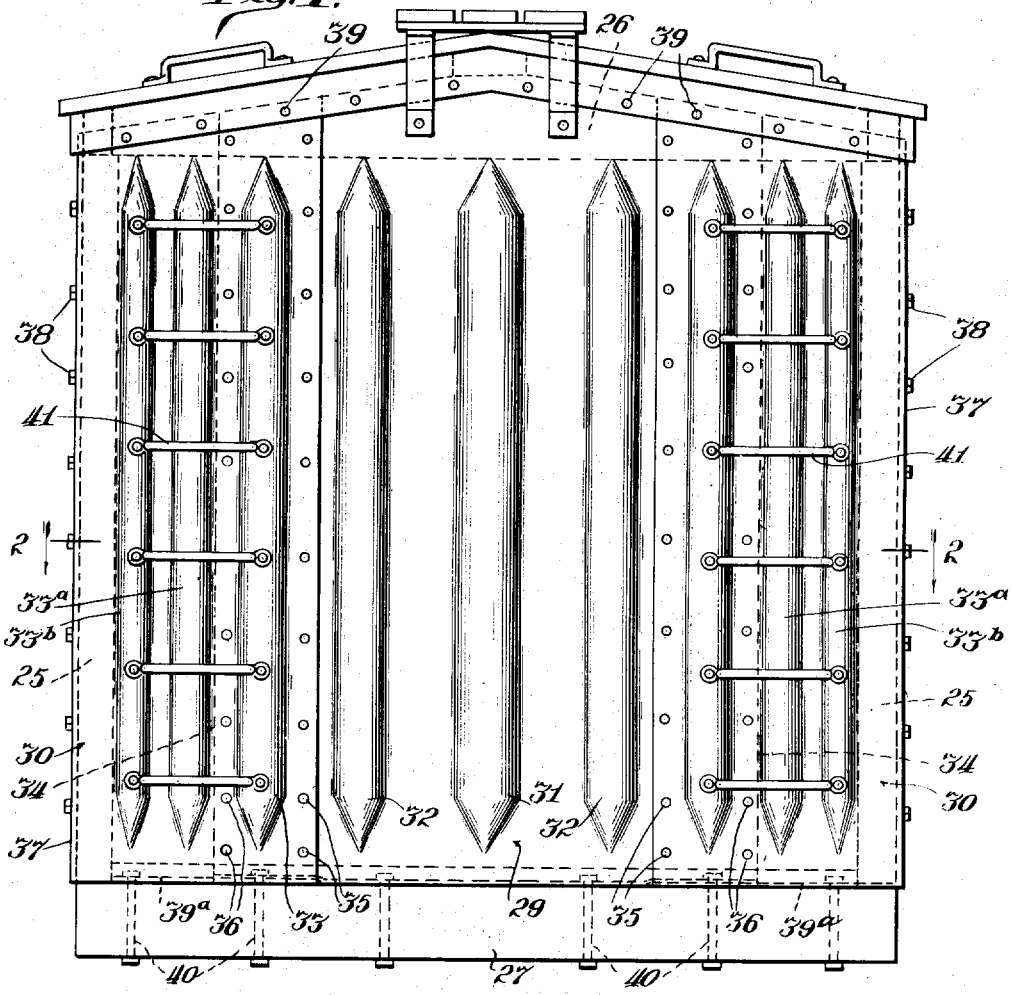

W. P. MURPHY.

CORRUGATED SHEET METAL CAR END.

APPLICATION FILED FEB. 23, 1921.

Reissued Sept. 13, 1921. 15,193.

Inventor

Walter P. Murphy

By Barnett & Truman

Attorneys

UNITED STATES PATENT OFFICE.

WALTER P. MURPHY, OF NEW YORK, N. Y.

CORRUGATED SHEET-METAL CAR END.

15,193. Specification of Reissued Letters Patent. Reissued Sept. 13, 1921.

Original No. 1,309,484, dated July 8, 1919, Serial No. 82,423, filed March 6, 1916. Application for reissue filed February 23, 1921. Serial No. 447,347.

*To all whom it may concern:*

Be it known that I, WALTER P. MURPHY, a citizen of the United States, and a resident of New York city, in the county of New York and State of New York, have made certain new and useful Improvements in Corrugated Sheet-Metal Car Ends, of which the following is a specification.

My invention relates to a corrugated sheet metal end structure for railway cars, more particularly box cars.

The end of a railway box car is subjected to very severe shocks and stresses due, among other things, to the tendency of the cargo to shift when the train stops and starts. If the end of the car consists of a single panel, made up of one or more sheets, which extends across the end of the car from one corner post to the other and depends upon corrugations for giving it the necessary rigidity, instead of the ordinary end posts and braces, it is obvious that the thrusts and pressures are likely to be most destructive when applied to the center portion of the panel since deflection will be greatest at the points remote from the places of attachment to the car frame. It is desirable, therefore, in an end structure of this type, that the center portion of the panel be especially reinforced so that the structure will successfully withstand, without undue deflection, the cargo thrusts and other stresses to which the end wall of a car is subjected when the car is in service.

My present invention contemplates forming a sheet metal car end structure with a central vertical stiffening and reinforcing corrugation of maximum depth and with corrugations on opposite sides thereof which diminish in depth toward the sides of the panel. This may be accomplished without diminishing the normal capacity of a car by pressing the corrugations so that they project outwardly from the plane of the outer faces of the corner posts. The center corrugation or corrugations can be made considerably deeper than the side corrugations without violating the provisions of the Interstate Commerce Commission as to end ladder clearance. This provision is to the effect that no part of the car above the end sills and within thirty inches from the side of the car shall extend to within twelve inches of the vertical plane parallel to the end of the car and passing through the inside faces of the coupler knuckle. By making the center corrugations deeper than the corrugations at the side the end structure is given added strength at the place where strength is required by the utilization of space permitted by the Interstate Commerce Commission regulation which does not involve shortening the inside longitudinal dimension of the car. The invention also contemplates making the middle sheet of thicker metal than the side sheets.

The principal object of my invention is to provide a corrugated sheet metal car end structure which will have the advantages above stated, or certain of them. The invention consists in the constructions, arrangements and devices to be hereinafter described and claimed for carrying out this object and such other objects as will appear from the following specification.

The invention is illustrated, in a preferred embodiment, in the accompanying drawings wherein—

Figure 2:
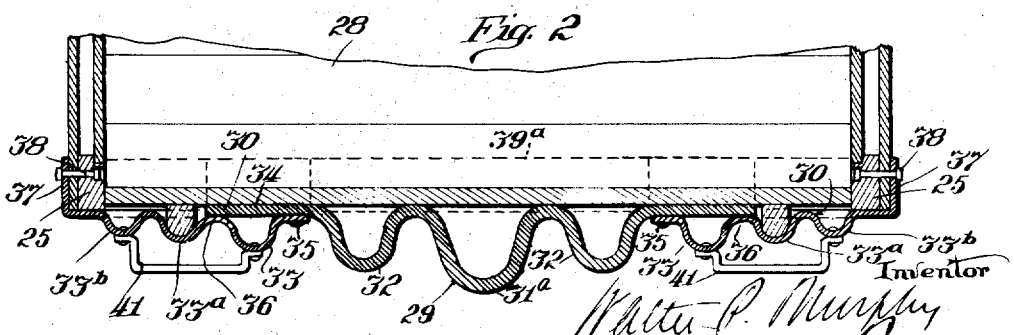

Figure 1 shows in elevation the end of the superstructure of a railway box car constructed in accordance with my invention, and Fig. 2 is a sectional plan on line 2—2 of Fig. 1.

Referring to the drawing, 25, 25 are corner posts at one end of the car, 26 the end plate, 27 the end sill and 28 the flooring of the car.

In the drawing I have shown a reinforced end structure in which the end panel may be constructed of three or more metal sheets. This embodiment preferably consists of a center sheet 29 and side sheets 30, 30, secured together along vertical lines. The center sheet is of thicker metal than the side sheets and is formed with a central corrugation 31 of maximum depth and with shallower corrugations 32 on opposite sides thereof. The side sheets 30, 30 are formed with a plurality of corrugations designated in the drawing at 33, $33^a$, and $33^b$ which decrease in depth toward the sides of the car. The corrugations of each sheet merge one into the other and gradually decrease in depth toward the sides of the car so that when the sheets are secured together, as hereinafter described, the entire panel will have a general sinuous configuration in cross-section. All of the corrugations preferably project outwardly from the flat portions of the sheet and terminate within the upper and lower edges of the sheet, having tapered terminals substantially as shown in Fig. 1 of the drawing. The center sheet 29 is provided with flat margins 34 at each side and these margins are overlapped by the inner edges of the side sheets 30, 30 which are secured to the flat margins 34 by two lines of rivets 35, 36 on opposite sides of the corrupations 33 of the side sheets. The outer vertical edges of the side sheets 30, 30 are preferably formed with angular flanges 37 which are attached to the corner posts 25 by bolts 38. The upper edges of the sheets are suitably secured to the car framing as by bolts 39 which extend through the end plate 26. The lower edges of the sheets are preferably formed with inturned flanges 39[a] which are secured to the end sill by bolts 40, the flanges intervening between the end sill 27 and the flooring 28 so as to make a grain-proof connection. The corrugations, besides serving to stiffen and reinforce the structure against cargo thrusts, also act as load carrying members and take some of the roof load. For this reason also it is desirable that the center sheet be made heavier than the side sheets and the corrugations adjacent the center of the panel be heavier than those at the side. It will also be obvious that by extending the flat margins of the center sheet back of the corrugations 33 so as to provide box girders at points intermediate the vertical center line of the end and the sides of the car, I provide additional reinforcements for the portions of the panel formed with the shallow corrugations. Assuming that the end ladders 41 project as far out as the law allows, with corrugations 33 formed as shown, it will be obvious that were the corrugations all of the same depth, it would be necessary either to sacrifice the additional strength and rigidity at the center of the car by making all of the corrugations relatively shallow or, if they were all deep, to set the end farther back with respect to the car, which would be at the sacrifice of the inside longitudinal dimension. The difficulty is resolved by making the center corrugation as deep as feasible and having the corrugations on opposite sides thereof decrease in depth toward the sides of the car. Forming certain of the shallower corrugations on separate sheets facilitates the operation of pressing the sheets since shallow corrugations are much more easily made than those of greater depth.

I claim:

1. A sheet metal end structure for a railway car, comprising a plurality of sheets overlapped and secured together and to the frame of the car, and formed with one single corrugation of maximum depth adjacent the vertical center line of the end and with shallower corrugations on either side of the same, the sheet having the said deep corrugation being thicker than the other sheets.

2. A sheet metal end structure for a railway car comprising a plurality of sheets overlapped on vertical lines and secured together and to the frame of the car, and formed with one single corrugation of maximum depth adjacent the vertical center line of the end and with shallower corrugations on either side of the same, the sheet having the said deep corrugation being thicker that the other sheets.

3. A sheet metal end structure for a railway car comprising metal sheets formed at the center of the end with a single corrugation of maximum depth and with a plurality of parallel vertically disposed corrugations on opposite sides thereof which become gradually shallower toward the opposite sides of the panel.

4. A sheet metal end structure for a railway car comprising a plurality of metal sheets joined together along vertical lines and provided with a plurality of vertical corrugations, which are deepest at the central portion of the end and decrease in depth toward the sides, the sheet at the center of the structure being provided with flat marginal portions which overlap in each case one of the corrugations of the adjacent sheet providing a box girder extending substantially from the floor of the car to the roof thereof.

5. A sheet metal end structure for a railway car comprising a plurality of metal sheets joined together along vertical lines and provided with vertical corrugations, the sheet at the center of the structure being of thicker material than the adjacent sheets, and provided with marginal portions which overlap in each case one of the corrugations of the said adjacent sheet.

6. A sheet metal end structure for a railway car comprising a plurality of metal sheets formed with relatively deep vertical corrugations adjacent the center vertical line of the end and with shallower vertical corrugations at the sides thereof, the sheet at the center of the structure being provided with marginal portions which overlap in each case one of the corrugations of the adjacent sheet.

7. A sheet metal end structure for a railway car comprising a plurality of metal sheets formed with relatively deep vertical corrugations adjacent the center vertical line of the end and with shallower vertical corrugations at the sides thereof, the sheet at the center of the structure being provided with marginal portions which overlap in each case one of the corrugations of the adjacent sheet, the side sheets of said structure being provided with attaching flanges adapted to be secured to the side wall of the car.

8. A sheet metal end structure for a railway car comprising a plurality of vertically corrugated metal sheets joined together along vertical lines, the sheet at the center of the structure being of thicker material than the side sheets.

9. A sheet metal end structure for a railway car comprising a plurality of corrugated metal sheets joined together along vertical lines, the sheet at the center of the structure being of thicker material than the side sheets.

10. A sheet metal end structure for a railway car comprising a plurality of metal sheets joined together along vertical lines, the sheet at the center of the structure being of thicker material than the side sheets.

11. A sheet metal end structure for a railway car comprising a sheet metal end panel which is thicker adjacent the center of the structure than at the sides thereof.

12. A sheet metal end structure for a railway car comprising a plurality of sheets secured together and to the frame of the car and formed with relatively deep vertical corrugations adjacent the vertical center line of the end and with shallower corrugations on either side of the same, the sheet having the deepest corrugations being thicker than the other sheets.

13. A sheet metal end structure for a railway car comprising a plurality of sheets secured together on vertical lines and secured to the frame of the car and formed with relatively deep vertical corrugations adjacent the vertical center line of the end and with shallower corrugations on either side of the same, the said sheet having the relatively deep corrugations being thicker than the other sheets.

14. A sheet metal end structure for a railway car comprising metal sheets formed with a plurality of vertically disposed corrugations which are deepest at the center portion of the panel and become gradually shallower toward opposite sides of the same.

15. A sheet metal end structure for a railway car comprising a plurality of sheets secured together and formed with a relatively deep vertical corrugation adjacent the center line of the end outwardly projecting from the plane of said sheet metal structure, and with shallower vertical corrugations on either side of the first named corrugation, said corrugations terminating within the edges of the sheet and merging one into the other so as to provide a structure which is sinuous in its configuration.

16. A sheet metal end structure for a railway car comprising a plurality of sheets secured together and formed with a relatively deep vertical corrugation adjacent the vertical center line of the end and with shallower vertical corrugations on either side of the same, said corrugations being formed with terminal portions tapered to a point within the edges of said structure.

17. A sheet metal end structure for a railway car comprising a plurality of sheets secured together on vertical lines and secured to the frame of the car and formed with a plurality of vertical corrugations which are deepest at the center portion and shallower adjacent the opposite edges of said structure.

18. A sheet metal end structure for a railway car comprising a sheet metal end panel formed with a plurality of vertically disposed corrugations which are relatively deep adjacent the vertical center line of the end of the panel and shallower adjacent the sides of the panel.

19. A sheet metal end structure for a railway car formed with vertically extending reinforcing projections, the cross sectional size of the projections adjacent the vertical center line of the end being greater than the cross sectional size of those at the sides thereof.

20. A sheet metal end structure for a railway car formed with a plurality of substantially vertical corrugations comprising a corrugation of maximum cross sectional size extending across the middle of the structure and corrugations of progressively diminishing cross sectional size at opposite sides of the first specified corrugation.

WALTER P. MURPHY.